United States Patent
Sasaki et al.

(10) Patent No.: US 6,847,783 B2
(45) Date of Patent: Jan. 25, 2005

(54) INSTANT CAMERA AND RECORDING APPARATUS

(75) Inventors: Wataru Sasaki, Saitama (JP); Seimei Ushiro, Saitama (JP)

(73) Assignee: Fuji Photo Film, Co., Ltd., Kanagawa (JP)

( * ) Notice: Subject to any disclaimer, the term of this patent is extended or adjusted under 35 U.S.C. 154(b) by 0 days.

(21) Appl. No.: 10/751,446

(22) Filed: Jan. 6, 2004

(65) Prior Publication Data

US 2004/0136703 A1 Jul. 15, 2004

(30) Foreign Application Priority Data

Jan. 8, 2003 (JP) ........................................ 2003-001754

(51) Int. Cl.$^7$ ............................ G03B 17/18; G03B 17/50
(52) U.S. Cl. ........................ 396/30; 396/203; 396/286; 396/290; 396/502; 396/284; 116/213; 116/279; 340/815.45; 358/302; 355/20
(58) Field of Search .................. 396/30, 286, 201–203, 396/287, 290, 502, 284; 116/213, 279; 340/815.45; 358/302; 355/20

(56) References Cited

U.S. PATENT DOCUMENTS

| | | | | |
|---|---|---|---|---|
| 4,114,173 A | * | 9/1978 | Tezuka et al. | 396/264 |
| 4,258,991 A | * | 3/1981 | Kuraishi | 396/203 |
| 6,621,988 B2 | * | 9/2003 | Takagi | 396/287 |
| 6,704,506 B2 | * | 3/2004 | Sasagawa | 396/88 |

FOREIGN PATENT DOCUMENTS

| | | | | |
|---|---|---|---|---|
| JP | 2002-202550 | | 7/2002 | ........... G03B/15/05 |
| JP | 2002-328408 | | 11/2002 | ............ G03B/5/00 |

* cited by examiner

*Primary Examiner*—W. B. Perkey
(74) *Attorney, Agent, or Firm*—Young & Thompson

(57) ABSTRACT

A camera body of an instant camera is provided with four light sources LED1 to LED4 for a display. The four light sources LED1 to LED4 flash on and off in mutually different display modes in accordance with the state of progress of a series of processing of an exposure operation, a developing operation and a delivery operation which is carried out in accordance with one time photographic operation. This feature makes it possible to exactly inform a user of the state of progress of a series of processing.

10 Claims, 8 Drawing Sheets

INSTANT CAMERA AND RECORDING APPARATUS

BACKGROUND OF THE INVENTION

1. Field of the Invention

The present invention relates to an instant camera wherein an instant film incorporating thereinto liquid developer, in which the liquid developer is developed after exposure so that a photograph appears, is mounted, and the instant film is exposed and the exposed instant film is delivered while the liquid developer is developed, and a recording apparatus that performs a recording on a recording medium and delivers the recording medium after recording.

2. Description of the Related Art

Some types of camera have a function of performing an alarm display and an operation explanation through the emission of light-emitting diode (hereinafter referred to as LED). Of those types of camera, there is one in which any one of a plurality of LED's provided on the periphery of a dial for adjusting an aperture turns on to inform a user of the optimum aperture position (cf. for example, Japanese Patent Application Laid Open Gazette TokuKai 2002-202550).

Further, there is one in which a vibration sensor detects a camera shake to perform a flashing display of an LED, so that it is informed an operator that the camera shake occurred (cf. for example, Japanese Patent Application Laid Open Gazette TokuKai 2002-328408).

In those cameras, the use of the LED's makes it possible to transmit a suitable photographic operation to a user.

By the way, in cameras, there is one, which is known by the name of an instant camera, and is a low price and is capable of being used by anyone with a light heart. In such an instant camera, in many cases, it happens that there is provided no display unit since it is the low price, and only the finder is used to visually recognize an angle of view in the photography. In the instant camera, an instant film incorporating thereinto liquid developer, in which the liquid developer is developed after exposure so that a photograph appears, is mounted, and the instant film is exposed and the exposed instant film is delivered while the liquid developer is developed. After a predetermined time elapses since the exposed instant film is delivered, a photograph appears on the instant film. According to the instant camera having no display unit, it is difficult to inform an operator of an operating mode and an operating condition using a display unit. For this reason, when the instant film is developed and delivered, a user may be worried that it takes too much time or the camera becomes out of order.

This is also applicable to a recording apparatus that performs a recording on a recording medium and delivers the recording medium after the recording.

SUMMARY OF THE INVENTION

In view of the foregoing, it is an object of the present invention to provide an instant camera and a recording apparatus capable of exactly transmitting the operating states of the instant camera and the recording apparatus to a user using a light emission control technology of the LED's.

To achieve the above-mentioned objects, the present invention provides an instant camera wherein an instant film incorporating thereinto liquid developer, in which the liquid developer is developed after exposure so that a photograph appears, is mounted, and the instant film is exposed and the exposed instant film is delivered while the liquid developer is developed, the instant camera comprising:

an image taking button for instructing a photography;

a plurality of light sources arranged in a delivery direction to deliver the instant film, including a light source for turning on the image taking button; and a display control section for causing the plurality of light sources to perform a display according to a delivery display mode in which the plurality of light sources sequentially repeatedly flash on and off in the delivery direction while the instant film is delivered.

This feature makes it possible to exactly inform a user of a matter that the instant film is now delivered by the flash of the plurality of light sources LED's.

In the instant camera according to the present invention as mentioned above, it is preferable that the instant camera further comprises a flash light emitting unit comprising: a main condenser for storing electric power for flash light emission; a flash light emitting section for emitting a flash light in synchronism with a photography upon receipt of a supply of the electric power from the main condenser; and a charging section for charging the main condenser in a predetermined timing including a timing just after the delivery of the instant film, and wherein the display control section causes the plurality of light sources to perform a display according to a charge display mode in which the plurality of light sources sequentially repeatedly flash on and off in a period shorter than that of the delivery display mode, while the charging section charges the main condenser.

This feature makes it possible to exactly inform a user of a matter that the charge is performed in a predetermined timing including a timing just after the delivery of the instant film. Here, in order to distinguish the charge display mode from the delivery display mode, the plurality of light sources sequentially repeatedly flash on and off in a period shorter than that of the delivery display mode, while the charging section charges the main condenser.

In the instant camera according to the present invention as mentioned above, it is preferable that the instant camera has a self timer photographic mode in which a photography is carried out after a lapse of a predetermined set time of a self timer since the image taking button is operated, and wherein the display control section causes the plurality of light sources to perform a display according to a self timer display mode in which the image taking button is first turned on or flashed on and off during the set time of the self timer after the operation of the image taking button in the self timer photographic mode, and then all the plurality of light sources are simultaneously turned on or flashed on and off.

In this manner, when the display according to the self timer display mode is performed, it is possible to exactly inform a user of the fact that the image taking button is depressed to perform the photographic operation, and also of a matter that the photographic timing is not far away. Particularly, in a case where the self timer is operated to perform photography such as a self taking picture photography, the display according to the self timer display mode makes it possible to exactly inform a photographer as the subject of the fact that the self timer is operated.

In the instant camera according to the present invention as mentioned above, it is preferable that the instant camera has a double self photographic mode in which an operation of a delivery of the instant film exposed after a lapse of a predetermined set time of a self timer since the image taking button is operated is repeated twice in accordance with one time operation of the image taking button, and wherein the display control section causes a same display mode to be repeated twice without the display according to the charge display mode during the photography twice in the double self photographic mode, and thereafter causes the display according to the charge display mode to be performed.

According to the instant camera of the present invention as mentioned above, there is provided the double self timer mode in which two times photographic operation can be continuously performed in this case, the same display mode is repeated at the time when the first photographic operation and the second photographic operation are performed. This feature makes it possible to exactly inform a user of the first photographic timing and the second photographic timing. According to the instant camera of the present invention, while the photography involving a flash light is performed at the time of the first photography, the display according to the charge display mode is not performed before the second photography is performed. This feature makes it possible to clearly inform a user of a matter that the second photography will be performed subsequent to the first photography. As a result, it is possible to prevent a failure of photography which will occur owing to such a matter that a photographer as the subject is not aware of the fact that the self timer operates before the second photography and thereby braking one's pose.

In the instant camera according to the present invention as mentioned above, it is preferable that the display control section causes the plurality of light sources to perform a display according to a self timer display mode in which the image taking button is first turned on or flashed on and off during the set time of the self timer after the operation of the image taking button in the double self photographic mode, and then all the plurality of light sources are turned on or flashed on and off; causes the plurality of light sources to perform a display according to the delivery display mode while the instant film is delivered; causes the plurality of light sources to again perform the display according to the self timer display mode prior to a second photography; causes the plurality of light sources to again perform the display according to the delivery display mode while a second instant film is delivered; and causes the plurality of light sources to perform a display according to the charge display mode while the second instant film is delivered.

In the instant camera according to the present invention as mentioned above, it is preferable that the display control section causes the plurality of light sources to perform a display according to a demonstration display mode in which the plurality of light sources repeatedly flash on and off in accordance with a predetermined operation in a state that photography is inhibited.

Provision of the demonstration display mode makes it possible to demonstrate the function of a plurality of light sources provided on the instant camera. Further, when the instant camera is sold on the storefront, the salesman's explanation that the plurality of light sources turn on in accordance with a series of operation of the instant camera makes it possible to demonstrate the convenience of the instant camera.

It is considered that the above-mentioned display control section is applied to a recording apparatus, such as a printer, that performs a recording on a recording medium and delivers the recording medium after the recording.

In a case where the above-mentioned display control section is applied to a recording apparatus, the present invention provides a recording apparatus that performs a recording on a recording medium and delivers the recording medium after the recording, the recording apparatus comprising:

a recording instruction button for instructing a recording;

a plurality of light sources arranged in a delivery direction to deliver the recording medium, including a light source for turning on the recording instruction button; and a display control section for causing the plurality of light sources to perform a display according to a delivery display mode in which the plurality of light sources sequentially flash on and off in the delivery direction while the recording medium after the recording is delivered.

Provision of the display control section on the recording apparatus makes it possible to exactly inform a user of the progressive state of a series of recording operation from the exposure operation to the delivery operation.

In the recording apparatus according to the present invention as mentioned above it is preferable that the recording apparatus has a plural recording mode in which a recording on a recording medium and a delivery of the recording medium after the recording are repeated by a plurality of number of times in accordance with one time operation of the recording instruction button, and wherein the display control section causes the plurality of light sources to repeat a same display mode by a plurality number of times in the plural recording mode.

In the recording apparatus according to the present invention as mentioned above, it is preferable that the display control section causes the plurality of light sources to perform a display according to a demonstration display mode in which the plurality of light sources repeatedly flash on and off in accordance with a predetermined operation in a state that a recording onto the recording medium is inhibited.

Provision of the plural recording mode on the recording apparatus makes it possible to repeatedly perform a recording on many sheets of recording medium and thereby obtaining many sheets of record. At that time, when the display according to the delivery display mode is repeatedly performed by the plurality of light sources, it is possible to exactly inform a user of the fact that the recording operation is repeatedly performed. This feature makes it possible to resolve a problem that when the recording medium, for example, an instant film, is delivered, a user may be worried that it takes too much time or the recording apparatus becomes out of order.

Provision of the demonstration display mode on the display control section makes it possible to obtain the same effects as those of the above-mentioned instant camera.

DETAILED DESCRIPTION OF PREFERRED EMBODIMENTS

Embodiments of the present invention will be described with reference to the accompanying drawings.

Figure 1:
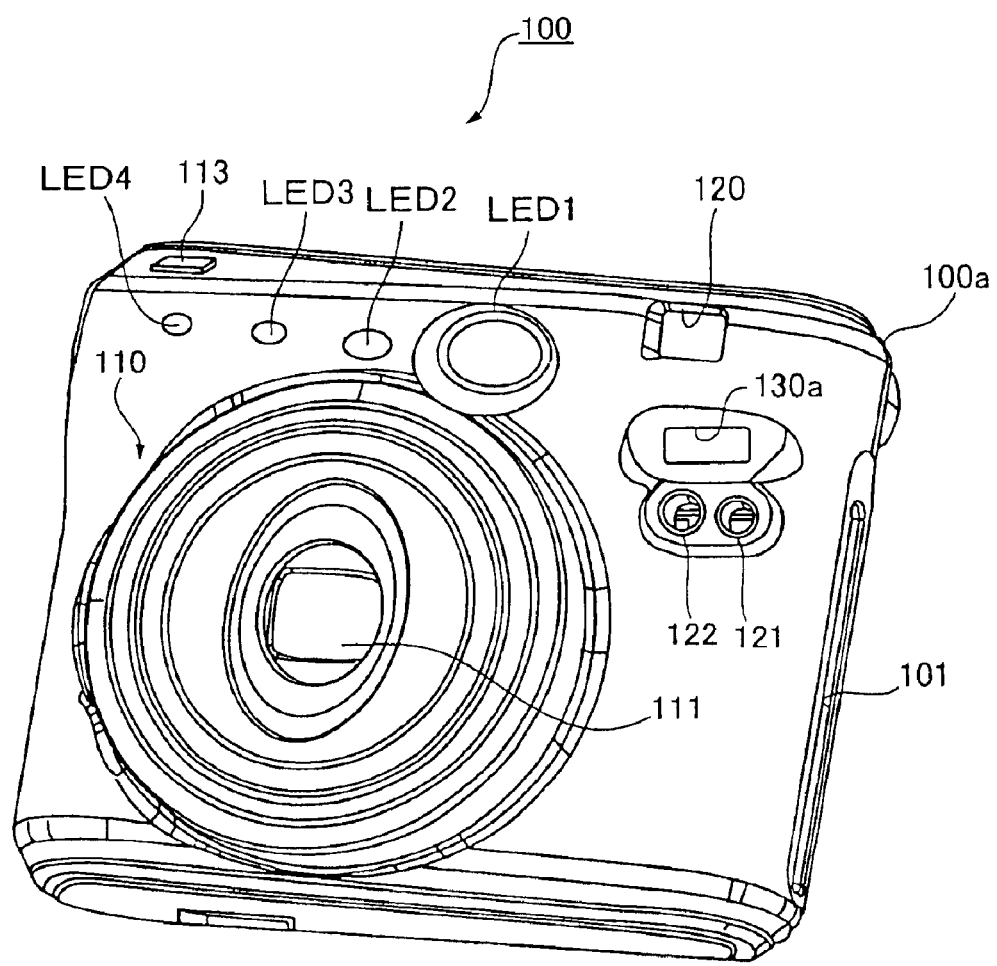
FIG. 1 is a perspective view of an instant camera according to an embodiment of the present invention.
Figure 2:
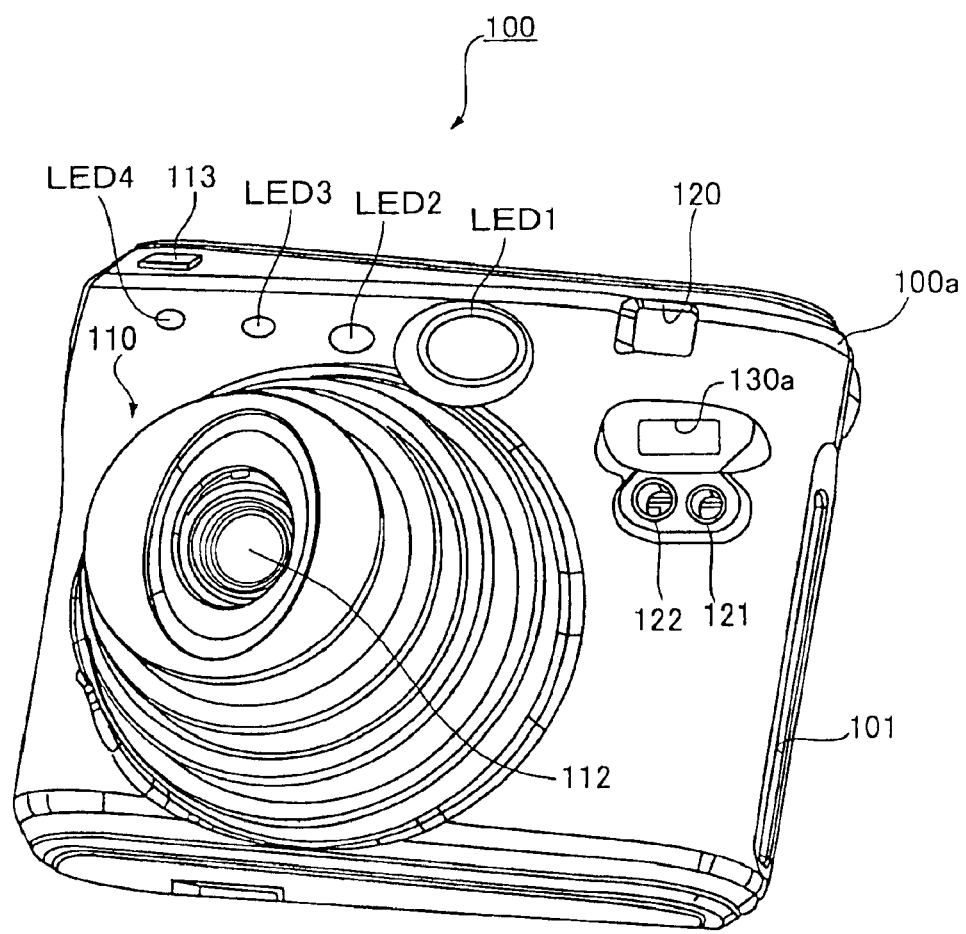
FIG. 2 is a perspective view of an instant camera according to an embodiment of the present invention.

Each of FIG. 1 and FIG. 2 is a perspective view of an instant camera according to an embodiment of the present invention.

FIG. 1 shows a collapsed state of a lens barrel wherein a power source turns off. FIG. 2 shows an extended state of the lens barrel wherein the power source turns on.

Now referring to FIG. 1 and FIG. 2, there will be explained a structure of an instant camera 100.

As shown in FIG. 1 and FIG. 2, a lens barrel 110 is disposed on the center of a camera body 100a. As shown in FIG. 1, when the lens barrel 110 is collapsed, the top of the lens barrel 110 is covered by a barrier 111 so as to prevent light from entering inside the camera body 100a via a lens incorporated into the lens barrel 110. When a power source turns on, as shown in FIG. 2, the barrier 111 is released, and the lens barrel 110 is extended, so that an image taking lens 112 appears. Thus, a subject light is introduced through the image taking lens 112 into a film mounted inside. When an image taking button 113, which is provided on the top of the camera body 100a, is operated, the photography is carried out.

As shown in FIG. 2, when the lens barrel 110 is extended and the image taking button 113 is operated for the photography, an angle of view for the photography is visually confirmed by a finder 120 upper right of the lens barrel 110 and the photography is carried out. According to the instant camera 100, when photography is carried out while an operator looks through the finder 120, brightness of field is measured in accordance with a field light introduced through a light receiving window 121 below the finder 120. The measurement of the brightness of field is carried out by a photometer disposed inside the instant camera. The photometer is provided with a photometry element such as a SPD (Silicon Photo Diode). The photometer is used to measure the brightness of field so that a shutter time of a shutter that operates in synchronism with a depression of the image taking button 113 is adjusted for photography.

The instant camera 100 is also provided with a flash light emitting unit for emitting flash light in which the brightness of field is measured, and when the CPU decides that the measured brightness of field is low brightness, the flash light is emitted. In the event that CPU decides that the measured brightness of field is low brightness, a flash light is emitted from a flash light emitting section of the flash light emitting unit through a flash light emitting window 130a below the finder 120 to the subject. The camera body 100a is provided with a light control window 122 for introducing flash to a light control apparatus for detecting a quantity of light of a flash emission when the flash is emitted to automatically stop the flash. The light control window 122 is located beside the light receiving window 121.

In this manner, according to the instant camera 100, the photometer, for example, the SPD is used to measure the brightness of field, and a shutter time is adjusted in accordance with the brightness of field thus measured, so that the photography is carried out. In the event that the CPU, which is disposed inside the camera, decides that the measured brightness of field is low brightness, a flash light is emitted from the flash light emitting section of the flash light emitting unit so that a photography is carried out. Further, according to such an instant camera, the light control apparatus detects a light quantity of the flash to control a flash time so that the proper light quantity of the flash is applied to the film, and whereby a high-definition photography is carried out. In this manner, according to the instant camera 100, the photometer and the light control apparatus are operated so that the proper light quantity of the flash is applied to the film, and whereby a high-definition photography is carried out.

According to the instant camera 100, as the above-mentioned film, a film, which is referred to an instant film pack wherein the instant films are laminated, is mounted on a mounting room inside the camera body 100a. In the instant film pack, the instant films are laminated. One instant film on the top of the laminated instant films is exposed in accordance with a photography operation, and the instant film is delivered while the liquid developer is developed after the exposure. For this reason, inside the camera body 100a there are provided a conveying mechanism of conveying the instant film to an outlet in accordance with the photography operation and a developing roller for developing the liquid developer. After the photography operation is carried out once and the instant film is exposed, the conveying mechanism conveys the instant film to the developing roller and the developing roller delivers the instant film through the outlet 101 while liquid developer is developed. Thus, after the instant film developed in the liquid developer by the developing roller is delivered through the outlet 101, a photograph appears on the instant film after the lapse of a predetermined time. In this manner, according to the instant camera, a series of processing of an exposure operation, a developing operation and a delivery operation is controlled by a CPU (which will be described later) in accordance with once photography operation, so that the instant film developed in the liquid developer is delivered to form a photograph.

In this manner, according to the instant camera, the CPU controls a series of processing. Thus, the instant camera 100 sequentially flashes four light sources LED1 to LED4 in synchronism with a timing of the series of processing. Here, as the light sources, there are used LED's. Those four light sources LED1 to LED4 are arranged forming a line in a delivery direction of delivering the instant film, upper the lens barrel 110. Of the four light sources LED1 to LED4, the light source LED1, which is closest to the outlet, serves as also a photography button for issuing instructions of photography.

When a user depresses the light source LED1, which serves as also the image taking button, or the image taking button 113, so that the photography operation is carried out, the four light sources LED1 to LED4 sequentially flash on and off in accordance with the photography operation. As mentioned above, since a series of processing of an exposure operation, a developing operation and a delivery operation is controlled by the CPU, the CPU makes it possible to sequentially flash the four light sources LED1 to LED4 in synchronism with the series of processing.

Figure 3:
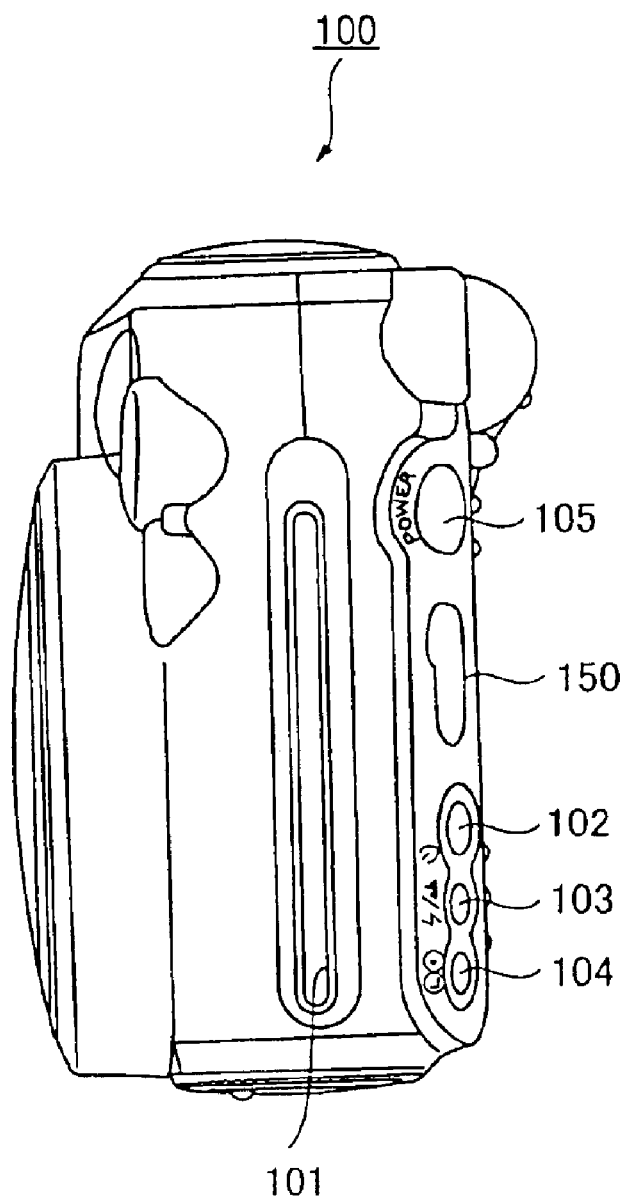
FIG. 3 is a side view of an instant camera according to an embodiment of the present invention.

FIG. 3 is a side view of the instant camera according to the embodiment of the present invention.

The instant camera has a plurality of photographic modes. A plurality of handlers is provided at the right of the outlet 101 forming a line.

As shown in FIG. 3, as the handlers, there are provided a self-timer mode switch 102, a distant view/flash light compulsion off mode changeover switch 103, and a light and shade brightness mode changeover switch 104. In addition a power switch 105 is provided at the opposite side with respect to a LCD panel 150.

According to the instant camera 100, when the self-timer mode switch 102 is depressed to activate a self-timer mode, self-timer photography is available. The self-timer mode is used when self-taking picture photography is performed. In the self-timer mode, a photographer depresses the light source LED1, which serves as also the image taking button, or the image taking button 113, and takes a part as the subject for photography. The instant camera 100 is also provided with a double self-timer mode. When the self-timer mode switch 102 is depressed twice, the double self-timer mode is activated, so that photography can be performed in the self-timer mode continuously twice. In the double self-timer mode, it is possible to perform self-timer photography continuously twice. This makes it possible that a person, who had one's photograph taken in the first photography, changes one's pose and has one's photograph taken in the second photography with the same background.

When the self-timer mode and the double self-timer mode are activated to perform photography, the CPU controls the flash of the four light sources LED1 to LED4 in accordance with the operating state of the self-timer mode switch 102.

The instant camera 100 is further provided with a distant view mode and a flash light compulsion off mode. The distant view/flash light compulsion off mode changeover switch 103 performs changeover of those modes. Whenever a user depresses the distant view/flash light compulsion off mode changeover switch 103, the distant view mode or the flash light compulsion off mode is activated. In the instant camera 100, lenses are arranged so as to be in focus for a short distance, assuming that a photograph of a subject, which is mainly indoors or near, is taken. For this reason, when the distant view/flash light compulsion off mode changeover switch 103 is depressed to select the distant view mode, a lens barrel is driven to adjust a lens position so that the camera is in focus over a sufficiently great distance from a predetermined distance. When the distant view/flash light compulsion off mode changeover switch 103 is depressed again to select the flash light compulsion off mode, the flash light emission is inhibited so that photography involving no flash light emission can be performed even if the brightness of field is low.

The instant camera is further provided with a light and shade brightness mode. Changeover between a light mode and a shade mode is performed in accordance with a toggle operation of the light and shade brightness mode changeover switch 104. When the light mode is selected, the shutter time is controlled so that the brightness of the finished photograph is light in its entirety. When the light and shade brightness mode changeover switch 104 selects the light, the brightness of field measured by a photometer (SPD) 142 is not used directly, and the shutter time is controlled, for example, assuming that a brightness of field is more dark than the brightness of field measured by the photometer. As a result, as compared with a case where the shutter time is controlled in accordance with the measured value by the photometer (SPD) 142, a somewhat larger quantity of light is applied to the film for photography, so that a somewhat lighter photograph can be obtained in its entirety. When the light and shade brightness mode changeover switch 104 selects the shade, the situation is opposite and a somewhat smaller quantity of light is applied to the film for photography, so that a somewhat darker photograph can be obtained in its entirety.

Further, the instant camera 100 is provided with the LCD panel 150 of the LCD display unit on the portion where the switches are arranged in line. The operating state of the respective switch is displayed on the LCD panel 150 so that an operator knows the photographic mode.

As described above, the signal processing section of the instant camera 100 performs the processing for photography in accordance with the photographic mode set up by any one of the handlers.

Figure 4:
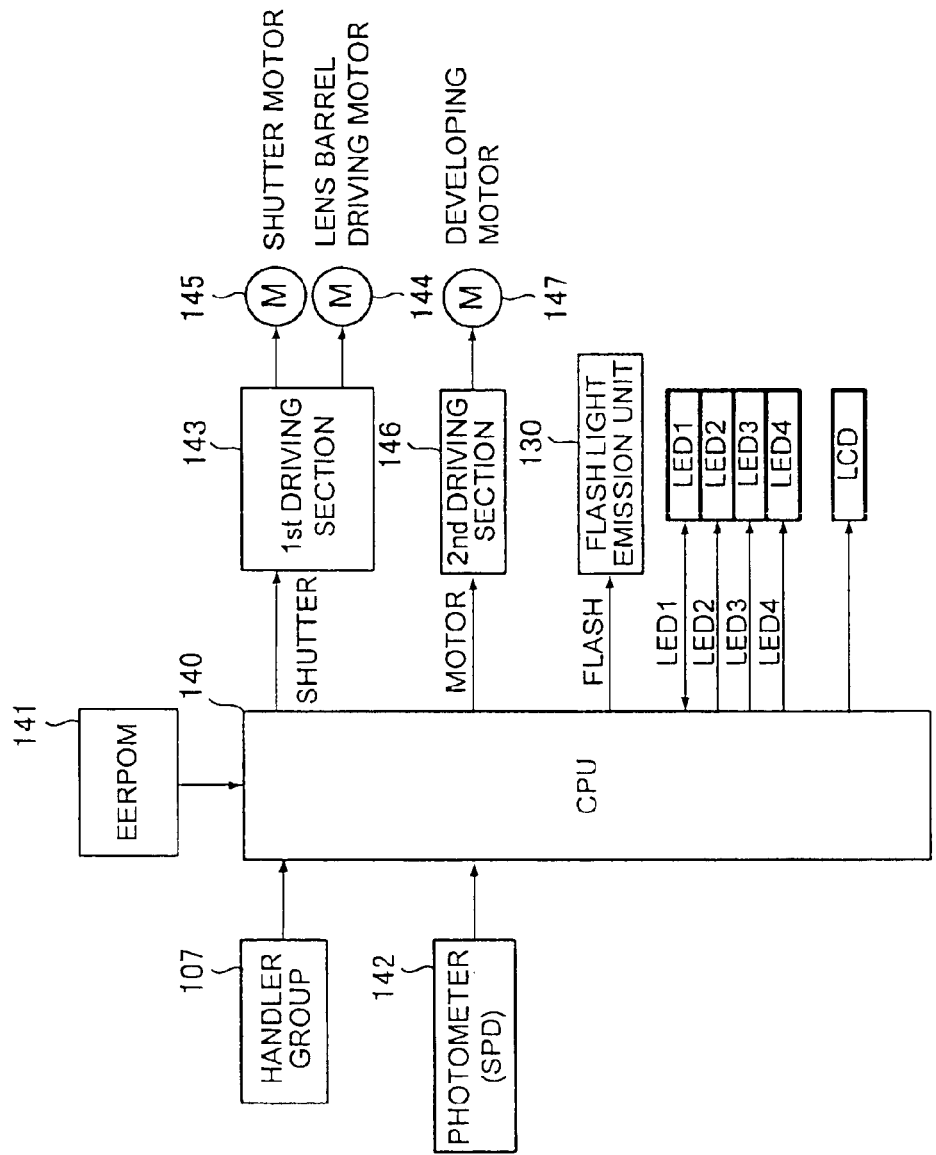
FIG. 4 is a structural block diagram of a signal processing section disposed inside the instant camera.

FIG. 4 is a structural block diagram of the signal processing section disposed inside the instant camera 100. A CPU 140 controls the instant camera 100.

The CPU 140 is provided with an EEPROM 141, which stores a program indicative of a procedure of processing of a camera operation. The CPU 140 receives signals based on the set up situation of a handler group 107 and the measured result from the photometer (SPD) 142. The CPU 140 feeds signals to a first driving section 143, a second driving section 146, the four light sources LED1 to LED4, and a flash light emission unit 130 to control the camera operation in accordance with the entered signals. The CPU 140 shown in FIG. 4 and the EEPROM 141, which stores a program indicative of a procedure of flash of the four light sources LED1 to LED4, correspond to the display control section referred to in the present invention.

The handler group 107 includes, as shown in FIG. 3, the self-timer mode switch 102, the distant view/flash light compulsion off mode changeover switch 103, and the light and shade brightness mode changeover switch 104. In accordance with the operating state of those switches, the CPU 140 controls the first driving section 143, the second driving section 146, the four light sources LED1 to LED4, and the flash light emission unit 130 in accordance with the photographic mode designated by those switches. The handler group 107 includes the image taking button 113 and the power switch 105.

The light source LED1 serves as the image taking button also. And thus, with respect to the light source LED1, an arrow indicates a path of a signal to be supplied to the CPU 140.

The flash light emission unit 130 of the instant camera 100 is also provided with charging equipment. The charging equipment gives a charge of electricity to a main condenser incorporated into the flash light emission unit 130. A signal denoted by a mark "FLASH" shown in FIG. 4 is an indication signal for the flash light emission. The charging equipment also receives a charging indication signal (not illustrated) to give an instruction of charge the charging equipment provided in the flash light emission unit 130. The charging indication signal is fed from the CPU 140 to the charging equipment provided in the flash light emission unit 130 in response to a signal generated from a voltage monitor provided in the flash light emission unit 130. The charging indication signal, which is fed from the CPU 140 to the flash light emission unit 130, is fed to the flash light emission unit 130 in a predetermined timing including a timing immediately after the instant film is delivered when the photographic operation is performed and the flash light is emitted. Also in the event that the instant camera is not used for a long time and the CPU 140 detects through the voltage monitor that the voltage of the main condenser is lowered, the charging indication signal is fed to the flash light emission unit 130.

Next, there will be explained the processing when the instant camera is used referring to FIG. 4.

First, when the power switch 105 (cf. FIG. 3) of the handler group 107 turns on, the CPU 140 detects that the power switch 105 turns on, and connects a battery (not illustrated) with the respective elements such as the first driving section 143, the second driving section 146, the four light sources LED1 to LED4, and the flash light emission unit 130, so that the battery supplies power to the respective elements. In this manner, when the power is supplied to the respective elements, the CPU 140 performs the extension of the lens barrel. At that time, the CPU 140 issues a driving instruction for a lens barrel motor 144 to the first driving section 143, so that the first driving section 143 drives the lens barrel motor 144. In this manner, extension of the lens barrel offers a photography standby mode in which operations for the light source LED1, which serves as also the image taking button, or the image taking button 113, and the respective handlers 102 to 104 are acceptable. When the light source LED1, which serves as also the image taking button, or the image taking button 113, is depressed for photography, the CPU 140 supplies a shutter open and shut instruction signal "SHUTTER" to the first driving section 143. The first driving section 143 receives the shutter open and shut instruction signal "SHUTTER" to drive a shutter motor. A shutter blade, which is driven by the shutter motor, causes an optical axis to be opened, so that a light quantity is applied to the instant film. The shutter open and shut instruction signal "SHUTTER" has two levels corresponding to the open and shut states of the shutter blade. Of the two levels of signal, a high level of signal causes the shutter motor to rotate so that the shutter blade is driven to open an optical shaft. And a low level of signal causes the shutter motor to reversely rotate so that the shutter blade is driven to close the optical shaft. According to the instant camera 100, a shutter time is adjusted in accordance with duration of the high level of the shutter open and shut instruction signal "SHUTTER", so that adequate light quantity is applied to the film.

The shutter time is one in which the CPU 140 computes the photometric value measured by the photometer (SPD) 142. The CPU 140 supplies to the first driving section 143 the high level of the shutter open and shut instruction signal "SHUTTER" by the corresponding shutter time thus computed, so that the shutter rotatably moves together with the shutter motor 145 and whereby the optical shaft is released. After the shutter time elapsed, the shutter open and shut instruction signal "SHUTTER" is reversed to the low level so that the shutter blade is reversely rotatably moved together with the shutter motor 145 and whereby the optical shaft is closed. After the lapse of a predetermined time since the optical shaft is closed, the CPU 140 supplies to the second driving section 146 a high level of developing instruction signal "MOTOR" to drive a developing motor 147. The developing motor 147 drives the above-mentioned conveying mechanism and developing roller. When the developing motor 147 is driven, the conveying mechanism leads the instant film to the developing roller. The developing roller serves to deliver the instant film through the outlet 101.

According to the instant camera 100 of the present embodiment, the CPU 140 performs such a control that the four light sources LED1 to LED4 are sequentially flashed in synchronism with processing involved in a series of photographic operations as mentioned above. Since the four light sources LED1 to LED4 are arranged in a delivery direction, a suitable combination of those light sources in flash makes it possible to implement various display modes and also to exactly inform a user of the fact that an image taking operation is carried out, a photographic timing according to the image taking operation, and timings of the respective operations from the image taking operation start to the exposure operation, the delivery operation and the charging operation. What implements those mutually different display modes is the CPU 140 and the EEPROM 141, which correspond to the display control section referred to in the present invention. The CPU 140, which corresponds to the display control section of the instant camera, causes four light sources to flash in different display modes in accordance with a program described in the EEPROM 141 which corresponds to the display control section. The EEPROM 141 describes a program describing processing procedures, which correspond to four display modes of a delivery display mode, a charge display mode, a self timer display mode, and a demonstration display mode, respectively. Accordingly, when any one of the handler groups is depressed, the CPU 140 activates any one of the above-mentioned modes, so that the four light sources can display in different display modes.

Next, there will be explained how the four light sources LED1 to LED4 are flashed in accordance with a series of camera operations related to a photographic operation.

First, to inform a user of the fact that a photographic operation is carried out, the CPU 140 causes the light source LED1, which serves as also the image taking button, to turn on. In this manner, when the CPU 140 causes the light source LED1, which serves as also the image taking button, to turn on in accordance with the program described in the EEPROM, it is possible to exactly inform the user of the fact that a photographic operation is carried out.

The turning on of the light source LED1 is continued from the photographic operation to the completion of the exposure operation. The continuation of the turning on of the light source LED1 makes it possible to inform the user of now on exposure too. When the exposure operation is terminated, the CPU 140 causes the light source LED1 to turn off and causes the four light sources LED1 to LED4 to sequentially flash on and off. At that time, since the CPU 140 recognizes the fact that the exposure is terminated, the CPU 140 sequentially supplies flash signals LED1 to LED4 to the four light sources LED1 to LED4 in synchronism with a developing instruction signal MOTOR when the developing instruction signal MOTOR is supplied to the second driving section 146.

A display in which the four light sources LED1 to LED4 are sequentially flashed corresponds to the delivery display mode referred to in the present invention. In order to terminate the display according to the delivery display mode after the instant film is completely delivered from the outlet to the exterior of the camera, the CPU 140 supplies signals holding the flash signals LED1 to LED4 at the low level to the four light sources LED1 to LED4. The flash signals LED1 to LED4, which instruct the flash of the four light sources LED1 to LED4, respectively, each has two levels. Of the two levels, the high level serves to turn on the associated light source, and the low level serves to turn off the associated light source.

Incidentally, the reason why the reference symbols applied to the light sources LED1 to LED4 are the same as the reference symbols applied to the flash signals LED1 to LED4 to be supplied to those light sources is that when a timing of the display is explained using a timing chart that will be describe later, the correspondence between the flash signal and the light source is clarified.

The above-mentioned explanation is concerned with a case where the flash light emission is not carried out in synchronism with the photographic operation. In the event that the flash light emission is carried out in synchronism with the photographic operation, a charging device of the flash light emission unit 130 performs a charge to a main condenser in timing including the timing just after delivery of the instant film, and thus the fact that it is now on charging is indicated to a user with different display modes in the four light sources LED1 to LED4. At that time, the four light sources LED1 to LED4 are flashed in the shorter period than that of the display according to the delivery display mode. This corresponds to the charge display mode referred to in the present invention.

In this manner, the CPU 140 controls the periods of the flash of the four light sources LED1 to LED4 in accordance with a series of development operation for the instant film related to the photographic operation, so that there is exactly informed a user of information as to whether the photographic operation is performed, whether the exposure is performed on the instant film, whether the delivery operation is performed while the instant film is developed, and whether the charging to the main condenser is performed upon completion of the delivery operation.

Thus, flashing on and off the four light sources LED1 to LED4 in different display modes makes it possible to exactly inform a user of the progressive situation of a series of operation related to the photographic operation of the instant camera. Particularly, turning on the light source LED1, which serves also as the image taking button, together with the photographic operation, makes it possible to exactly inform a user of the fact that the photographic operation is performed.

According to the instant camera of the present embodiment, also when the four light sources LED1 to LED4 are used and another photographic mode is selected, it is possible to exactly inform a user of the operating situation in the associated photographic mode.

For example, in the event that the self timer mode switch 102 is depressed before the photographic operation is performed, the CPU 140 detects that the self timer photographic mode and performs the self timer processing in accordance with a procedure of the self timer processing described in the EEPROM 141. At that time, a value indicative of the time of the self timer is set up in the CPU 140. After the operation of the light source LED1, which serves also as the image taking button, or the image taking button 113, the CPU 140 causes the light source LED1, which serves also as the image taking button, to turn on during the time of the self timer, and then causes the four light sources LED1 to LED4 to simultaneously turn on. This display mode corresponds to the self timer display mode referred to in the present invention. In this manner, the CPU 140 causes the light source LED1, which serves also as the image taking button, to turn on, and then causes the four light sources LED1 to LED4 to simultaneously turn on. Thus, this feature makes it possible to inform a user of a matter that the photographic timing is not far away. After tun on of the light source LED1, which serves also as the image taking button, and turn on of the four light sources LED1 to LED4, are continued during the set time of the self timer, the shutter blade rotatably moves to open the optical axis so that a light quantity is applied to the film. After the shutter blade is released by the shutter time, the optical axis is closed again by the shutter blade, so that the instant film is exposed. Then a series of processing from the developing operation to the delivery operation is performed in accordance with the instruction of the CPU 140. When the series of processing after the exposure is performed, the display is performed in accordance with the delivery display mode. When the CPU 140 detects the double self timer mode by twice depression of the self timer switch, processing for twice continuous photography is carried out. In the double self timer mode, there is repeated twice an operation of delivery of the instant film exposed after the lapse of a predetermined set time of the self timer in accordance with one time operation of the image taking button. At that time, the CPU 140, which is the display control section, provides such a control that the same display mode is repeated twice without the display according to the charge display mode between the twice photography, and the display according to the charge display mode is performed. This feature makes it possible to exactly inform an operator, who is the subject too, of a matter that the photographic timing is not far away through going into operation of the self timer, even if the charging is carried out when the second photography is being performed after the first photography is terminated. Thus, it is possible to inform persons as the subject, who are also the photographic operator, of the second photographic timing. And also in the second photography it is possible to take a photograph desired by the persons as the subject maintaining poses for one's picture.

Next, there will be explained the above-mentioned display modes in conjunction with a timing chart.

Figure 5:
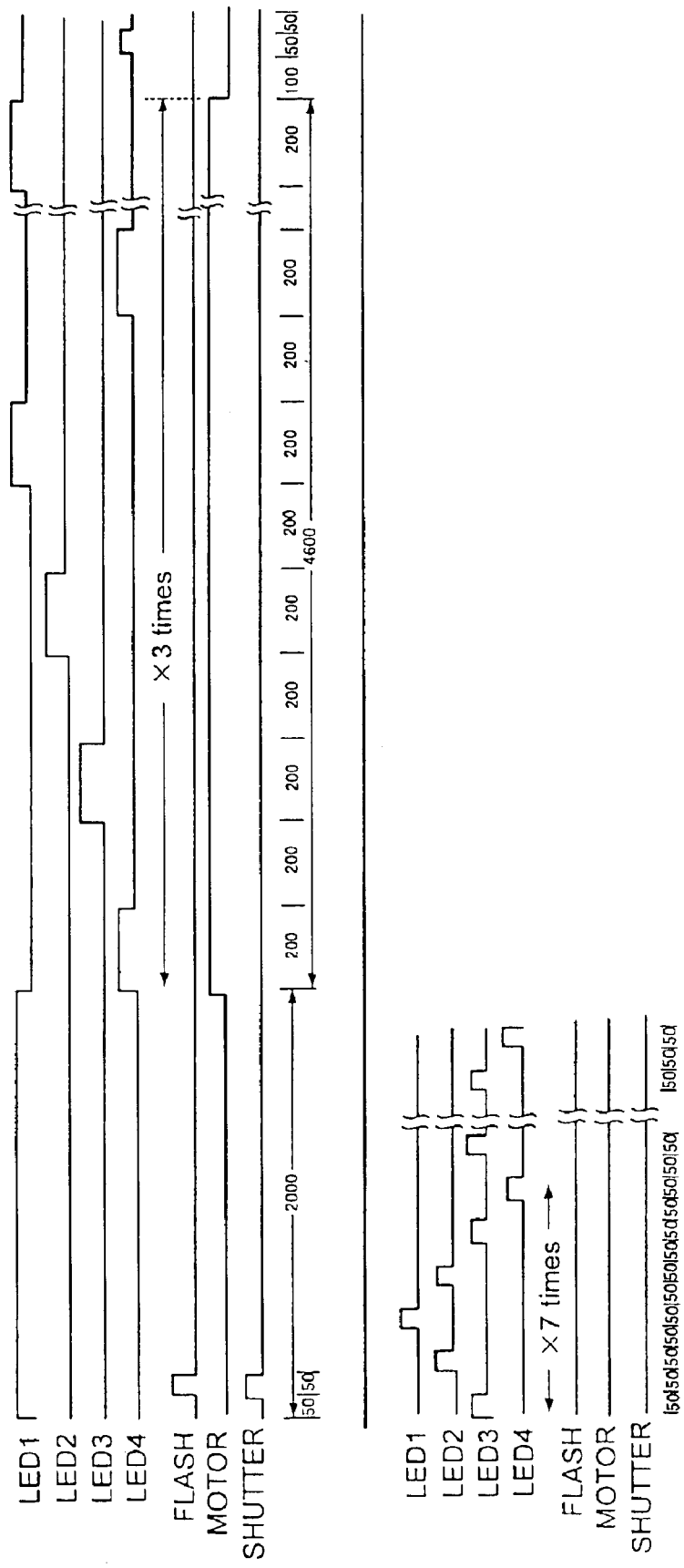
FIG. 5 is a timing chart useful for understanding flash conditions of four light sources at the time of the usual photography.

FIG. 5 is a timing chart useful for understanding flash conditions of four light sources at the time of the first photography. The vertical axis in FIG. 5 denotes the amplitude and the horizontal axis in FIG. 5 denotes the time. In FIG. 5, the timing chart set forth at the upper stage continues to the timing chart set forth at the lower stage.

The reference symbol marks for signals shown in FIG. 5 correspond to the signal names denoted in FIG. 4, and the signals associated with the signal names are supplied from the CPU 140 to ones associated with the signals. Numeral values of the horizontal axis denote time, and its unit is a millisecond (msec). In FIG. 5, the flash signals LED1 to LED4, the indication signal FLASH for the flash light emission, the shutter open and shut instruction signal SHUTTER, and the developing instruction signal MOTOR supplied to the second driving section 146 are all of two levels of signals. Of those two levels, the high level indicates the operative state. For example, in case of the flash signals LED1 to LED4 for flashing on and off the four light sources, the high level is concerned with the turn on state; in case of the shutter open and shut instruction signal SHUTTER, the high level is concerned with the shutter open state; in case of the indication signal FLASH for the flash light emission, the high level is concerned with the flash light emission state; and in case of the developing instruction signal MOTOR for driving the developing motor, the high level is concerned with the developing motor driving state.

First, when the CPU 140 detects the fact that the light source LED1, which serves as also the image taking button, or the image taking button 113, is depressed, the CPU 140 supplies the high level state of the flash signal LED1 to the light source LED1 to turn on the light source LED1. According to the timing chart, the high level state of the shutter open and shut instruction signal SHUTTER and the indication signal FLASH indicates that the flash light is emitted at the same time when the optical axis is released by the shutter blade after a lapse of 50 msec since the light source LED1, which serves as also the image taking button, or the image taking button 113, is depressed.

According to the usual photography, it is informed a user that the photographic operation is performed in such a manner that after the light source LED1, which serves as also the image taking button, or the image taking button 113, is depressed, the light source LED1 is continued to turn on about 2000 msec. After a lapse of 2000 msec since the exposure, the light source LED1 is turned off and the CPU 140 supplies the high level state of the developing instruction signal MOTOR to the second driving section 146. The developing instruction signal MOTOR drives the developing motor, so that a processing to the delivery of the film sheet is carried out while the developing instruction signal MOTOR offers the high level state. Since a period that the developing motor is driven corresponds to the delivery display mode, the four light sources are sequentially flashed in accordance with the flash signals LED1 to LED4 for flashing on and off the four light sources. Here, first, the light source LED 4 is turned on, then with a predetermined interval, for example, 200 msec the light source LED 3 is turned on, next, with 200 msec the light source LED 2 is turned on, and then with 200 msec the light source LED 1 is turned on. A direction from the light source LED 4 to the light source LED 1 indicates the delivery direction. A flash of the four light sources LED1 to LED4 is repeated sequentially in that direction. The characters "×3 times" denote three times repetition of a series of flash operation from the light sources LED4 to LED1. The three times flash operation is continued during a period that the developing instruction signal "MOTOR" offers the high level state, that is, a period of 4600 msec, and is terminated at the same time when the developing instruction signal "MOTOR" is inverted into the low level. The display mode, in which the four light sources LED1 to LED4 repeat the sequential flash operation every 200 msec, corresponds to the delivery display mode. When the developing instruction signal "MOTOR" is inverted into the low level, the instant film has been delivered from the outlet out of the instant camera.

Thus, the CPU 140 causes the four light sources to perform a display in the charge display mode in a predetermined timing including the timing of the delivery, that is, here, after 100 msec since the developing instruction signal "MOTOR" is inverted into the low level. As will be seen from the indication signal "FLASH" for the flash light emission, according to the present embodiment, the flash light emission is performed. And thus, it is informed a user the fact that the charge is carried out in such a way that the four light sources LED1 to LED4 is displayed in the charge display mode. At that time, the CPU 140 causes the light sources to perform a display with changing the order of turn-on of the light sources every 50 msec, such as from the light source LED 4 to the light source LED 1 and to the light source LED 4. The CPU 140 causes the four light sources to sequentially flash on and off in a shorter period than that of the display according to the delivery display mode.

A flash of the four light sources LED1 to LED4 in mutually different display modes in the manner as mentioned above males it possible to exactly inform a user of the matters that the instant film is delivered from the outlet, and the main condenser is charged in a predetermined timing including the timing that the delivery is terminated.

Since there are prepared four light sources LED1 to LED4, a suitable combination of the four light sources LED1 to LED4 in a flash state makes it also possible to exactly inform the user of another operating state of the instant camera.

Figure 6:
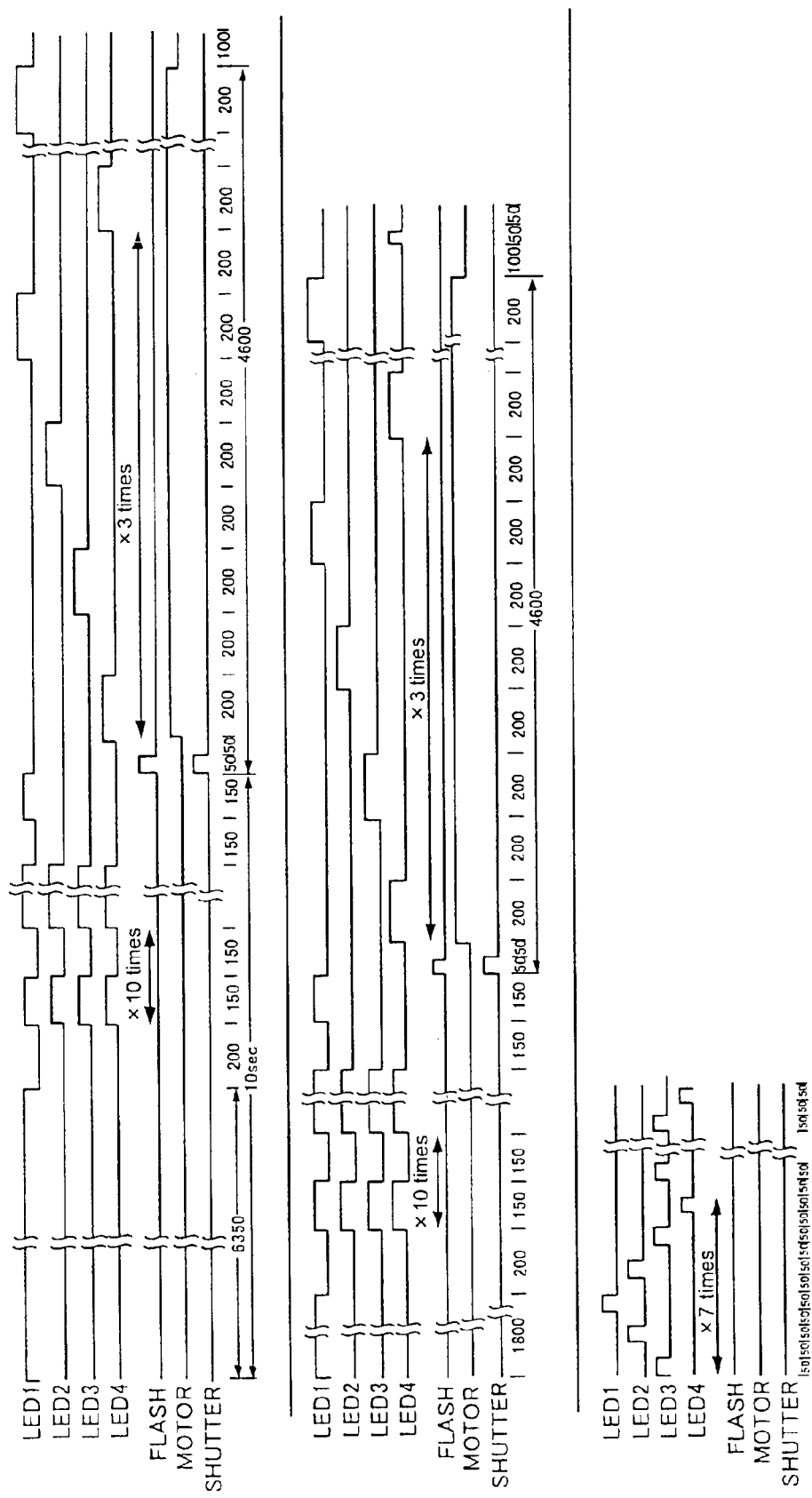
FIG. 6 is a timing chart useful for understanding flash conditions of four light sources at the time when the photography is performed in a double self timer photographic mode.

FIG. 6 is a timing chart useful for understanding flash conditions of four light sources at the time when the photography is performed in a double self timer photographic mode. The vertical axis in FIG. 6 denotes the amplitude and the horizontal axis in FIG. 6 denotes the time. In FIG. 6, the timing chart set forth at the upper stage continues to the timing chart set forth at the middle stage and the lower stage.

According to the double self timer photographic mode, a photography by the self timer is performed two times. First, when the self timer switch is depressed twice to start the double self timer photographic mode and the light source LED1, which serves as also the image taking button, or the image taking button 113, is depressed, the CPU 140 causes the light source LED1 to continuously turn on 6350 msec in order to inform a user of the fact that the photographic operation is carried out. After the lapse of 350 msec the light source LED1 turns off, and then after 200 msec the four light sources simultaneously flash on and off. This flash is repeated ten times every 150 msec. The total time including the turn on time of the first light source LED1 corresponds to the set time of the self timer. The reason why the four light sources LED1 to LED4 are simultaneously turned on is that it is informed the photographer as the subject of a matter that the photographic timing is not far away. After the four light sources LED1 to LED4 are flashed on and off, there is performed a display by the delivery display mode in accordance with a series of photographic operation from the exposure operation to the delivery operation. According to the double self timer mode shown in FIG. 6, there is repeated twice the operation of delivery of the instant film exposed through the operation after the lapse of a predetermined set time of the self timer in accordance with one time operation of the image taking button, and thus the same display mode is repeated twice without interposing the display according to the charge display mode between the twice photography, and thereafter the display according to the charge display mode is performed. At that time, in order to exactly inform a user of the fact that the photographic operation is performed, it is performed that the light source LED1, which serves as also an image taking button, is turned on, and it is informed that the first and second photographic timings are not far away, in such a manner that the four light sources LED1 to LED4 are simultaneously turned on.

This feature makes it possible to exactly inform a user of the matter that the self timer operates in a similar fashion to that of the first photography and the photography is not far away even if a charge is carried out after the first photography is terminated.

While the above explanation is made in connection with the double self timer mode, the self timer mode is concerned with a mode wherein the four light sources performs by one time a display according to the self timer display mode which is carried out twice in the same display mode.

The instant camera according to the present embodiment is provided with a demonstration display mode so that a salesman can demonstrate the function of the four light sources LED's.

According to the demonstration display mode, it is possible that a plurality of light sources repeatedly flashes on and off in accordance with a predetermined operation in a state that the display control section, which comprises the CPU 140 and the EEPROM 141, is inhibited in photography.

Figure 7:
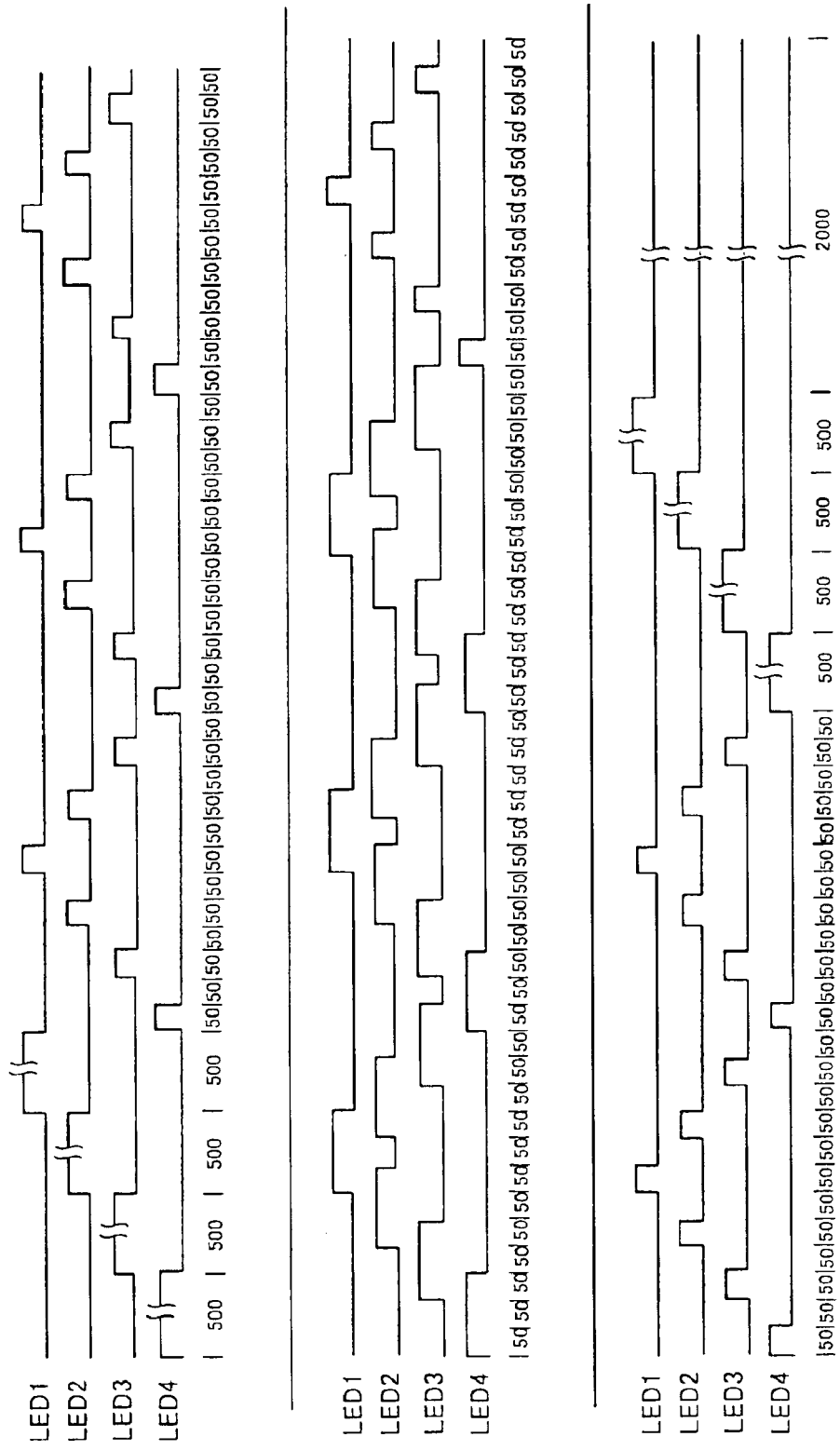
FIG. 7 is a timing chart useful for understanding flash conditions of four light sources at the time of the demonstration mode.

FIG. 7 is a timing chart useful for understanding flash conditions of four light sources at the time of the demonstration mode. In FIG. 7, the timing chart set forth at the upper stage continues to the timing chart set forth at the middle stage and the lower stage.

According to the instant camera of the present embodiment, the demonstration mode is activated, for example, when the power switch is depressed while the image taking button is depressed. At that time, since the flash of the light sources is performed while the lens barrel is collapsed, the four light sources are repeatedly flashed on and off in the state that photography is inhibited.

As shown in FIG. 7, according to the demonstration display mode, the CPU 140 first turns on the light source LED4 during 500 msec, and then turns on the light source LED3, the light source LED2 and the light sources LED1 each during 500 msec in the named order. Thereafter, the CPU 140 repeatedly turns on the light sources upon changing the order of turn-on of the light sources from the light source LED4 to the light source LED1 and again to the light source LED4 for every 50 msec. After the flash every 50 msec is repeated by three times, then the adjacent LED's are flashed on and off on an overlapping basis. After this overlapping flash is repeated three times, the flash every 50 msec is repeated again. In this case, the CPU 140 causes a display according to a display mode, in which a series of processing shown in FIG. 7 is treated as the display mode, to be carried out repeatedly. In this manner, when the CPU 140 causes a display according to the demonstration display mode in the state that the photography is inhibited, to be carried out, it is possible that the four light sources serve as an illumination when the instant camera is exhibited at a storefront, so that the illumination can demonstrate the characteristic of the instant camera. The function of the display according to the demonstration display as the illumination makes it possible to resolve such user's dissatisfactions involved in the conventional instant camera that sounds when the instant film is developed and delivered are noisy, and the delivery of the instant film takes too much time. And thus according to the instant camera of the present embodiment, it is possible to let a user have an atmosphere that it is one's pleasure to use the instant camera.

In the event that at the time of sale of the instant camera, a salesman can explains to a user that the instant camera is provided with various different display modes such as the delivery display mode, the delivery display mode, a charge display mode, and the self timer display mode, it is possible to inform a user of the matter that this instant camera can be used with the more pleasure as compared with the conventional instant camera, and thereby contributing to promoting to sales.

Incidentally, according to the instant camera of the present embodiment, when the photographic operation is performed, the CPU 140 causes the light source LED1 also serving as the image taking button to go on turning on. However, the present invention is not restricted to this embodiment, and it is acceptable that the CPU 140 causes the light source LED1 also serving as the image taking button to flash on and off.

Further, according to the instant camera of the present embodiment, a plurality of same color of light-emitting diodes is used to implement mutually different display modes. However, the present invention is not restricted to this embodiment, and it is acceptable that LED's such as red, blue, green and white are used to implement mutually different display modes by the variation of the colors.

It is noted that the light source is not restricted to the LED, and it is acceptable that as the light source, electronic display elements such as an EL element and a LCD with a back light can be adopted.

Further, it is acceptable that the four light sources, which are controlled by the display control section of the present invention and perform a display in mutually different display modes, are applied to a recording apparatus for performing a recording on a recording medium in accordance with image data.

Figure 8:
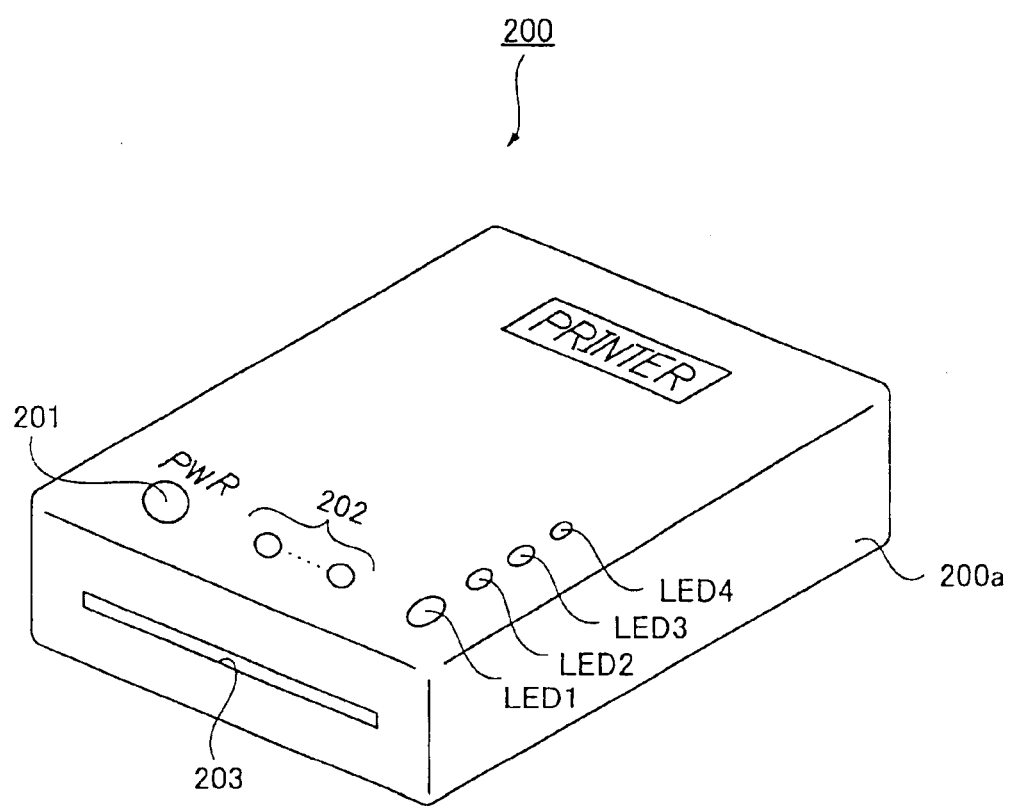
FIG. 8 is a perspective view of a recording apparatus that incorporates thereinto a display control section comprising a CPU and an EEPROM, which is the same as that of the instant camera of the present invention, and has four LED's.

FIG. 8 is a perspective view of a recording apparatus that incorporates thereinto a display control section comprising a CPU and an EEPROM, which is the same as that of the instant camera of the present invention, and has four LED's.

As shown in FIG. 8, a power switch 201 is provided on an upper surface of a cover member 200a of a recording apparatus 200. There are disposed four light sources LED1 to LED4, which are equal to those disposed on the instant camera, directed to a delivery outlet 203. Further, between the power switch 201 and the four light sources LED1 to LED4, there are provided handlers 202 for instructing a plural recording mode in which a delivery of recording medium is repeated by plurality of number of times.

While FIG. 8 shows it, there is provided an insertion section for inserting a memory card at the opposite side of the delivery outlet 203. When the memory card storing therein image data is inserted into the insertion section, a recording onto a recording medium or the instant film can be performed in accordance with the image data stored in the memory card.

Of the four light sources LED1 to LED4, the light source LED1 at the side of the delivery outlet 203 corresponds to the recording instruction button. When the recording instruction button is depressed, the recording onto the instant film can be performed. According to the recording apparatus 200, in a similar fashion to that of the instant camera, when a recording instruction is issued through the recording instruction button LED1, the four light sources LED1 to LED4, which are arranged in a delivery direction, flash on and off. When the light sources LED1 to LED4 flash on and off, the display control section provided inside the recording apparatus provides such a control that the same display as that in the delivery display mode shown in FIG. 4 is performed.

In the recording apparatus as mentioned above, it is possible to perform flash display and turn-on display in the recording operation, which are different from those in the delivery operation, as well as the sequential flash display in the delivery direction.

When the handler 202 selects the plural recording mode so that the plural recording mode is informed the CPU inside the recording apparatus, and the CPU activates the plural recording mode, the recording onto the instant film and the delivery of the instant film after the recording are repeated by a plurality of number of times in accordance with one time operation of the recording instruction button LED1. In the plural recording mode, the display control section, which comprises the CPU and the EEPROM, causes the four light sources LED1 to LED4 to repeat the same display mode by a plurality of number of times.

The display control section of the recording apparatus is provided with a demonstration display mode. For example, when the power switch is depressed while the recording instruction button is depressed, the CPU activates the demonstration display mode, so that the four light sources LED1 to LED4 repeatedly flash on and off in the state that the recording to the instant film is inhibited.

In this manner as mentioned above, the recording apparatus brings about the same effects as the instant camera.

As mentioned above, according to the present invention, it is possible to provide an instant camera and a recording apparatus capable of exactly informing a user of the operating states of the instant camera and the recording apparatus using a light emission control technology of the LED's.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An instant camera wherein an instant film incorporating thereinto liquid developer, in which the liquid developer is developed after exposure so that a photograph appears, is mounted, and the instant film is exposed and the exposed instant film is delivered while the liquid developer is developed, the instant camera comprising:

an image taking button for instructing a photography;

a plurality of light sources arranged in a delivery direction to deliver the instant film, including a light source for turning on the image taking button; and a display control section for causing the plurality of light sources to perform a display according to a delivery display mode in which the plurality of light sources sequentially repeatedly flash on and off in the delivery direction while the instant film is delivered.

2. An instant camera according to claim 1, wherein the instant camera further comprises a flash light emitting unit comprising: a main condenser for storing electric power for flash light emission; a flash light emitting section for emitting a flash light in synchronism with a photography upon receipt of a supply of the electric power from the main condenser; and a charging section for charging the main condenser in a predetermined timing including a timing just after the delivery of the instant film, and wherein the display control section causes the plurality of light sources to perform a display according to a charge display mode in which the plurality of light sources sequentially repeatedly flash on and off in a period shorter than that of the delivery display mode, while the charging section charges the main condenser.

3. An instant camera according to claim 1, wherein the instant camera has a self timer photographic mode in which a photography is carried out after a lapse of a predetermined set time of a self timer since the image taking button is operated, and wherein the display control section causes the plurality of light sources to perform a display according to a self timer display mode in which the image taking button is first turned on or flashed on and off during the set time of the self timer after the operation of the image taking button in the self timer photographic mode, and then all the plurality of light sources are simultaneously turned on or flashed on and off.

4. An instant camera according to claim 2, wherein the instant camera has a self timer photographic mode in which a photography is carried out after a lapse of a predetermined set time of a self timer since the image taking button is operated, and wherein the display control section causes the plurality of light sources to perform a display according to a self timer display mode in which the image taking button is first turned on or flashed on and off during the set time of the self timer after the operation of the image taking button in the self timer photographic mode, and then all the plurality of light sources are simultaneously turned on or flashed on and off.

5. An instant camera according to claim 2, wherein the instant camera has a double self photographic mode in which an operation of a delivery of the instant film exposed after a lapse of a predetermined set time of a self timer since the image taking button is operated is repeated twice in accordance with one time operation of the image taking button, and wherein the display control section causes a same display mode to be repeated twice without the display according to the charge display mode during the photography twice in the double self photographic mode, and thereafter causes the display according to the charge display mode to be performed.

6. An instant camera according to claim 5, wherein the display control section causes the plurality of light sources to perform a display according to a self timer display mode in which the image taking button is first turned on or flashed on and off during the set time of the self timer after the operation of the image taking button in the double self photographic mode, and then all the plurality of light sources are turned on or flashed on and off; causes the plurality of light sources to perform a display according to the delivery display mode while the instant film is delivered; causes the plurality of light sources to again perform the display according to the self timer display mode prior to a second photography; causes the plurality of light sources to again perform the display according to the delivery display mode while a second instant film is delivered; and causes the plurality of light sources to perform a display according to the charge display mode while the second instant film is delivered.

7. An instant camera according to claim 1, wherein the display control section causes the plurality of light sources to perform a display according to a demonstration display mode in which the plurality of light sources repeatedly flash on and off in accordance with a predetermined operation in a state that photography is inhibited.

8. A recording apparatus that performs a recording on a recording medium and delivers the recording medium after the recording, the recording apparatus comprising:

a recording instruction button for instructing a recording;

a plurality of light sources arranged in a delivery direction to deliver the recording medium, including a light source for turning on the recording instruction button; and a display control section for causing the plurality of light sources to perform a display according to a delivery display mode in which the plurality of light sources sequentially flash on and off in the delivery direction while the recording medium after the recording is delivered.

9. A recording apparatus according to claim 8, wherein the recording apparatus has a plural recording mode in which a recording on a recording medium and a delivery of the recording medium after the recording are repeated by a plurality of number of times in accordance with one time operation of the recording instruction button, and wherein the display control section causes the plurality of light sources to repeat a same display mode by a plurality number of times in the plural recording mode.

10. A recording apparatus according to claim 8, wherein the display control section causes the plurality of light sources to perform a display according to a demonstration display mode in which the plurality of light sources repeatedly flash on and off in accordance with a predetermined operation in a state that a recording onto the recording medium is inhibited.

* * * * *